May 8, 1928.

A. KINGSBURY 1,668,648

THRUST BEARING

Filed June 14, 1923    2 Sheets-Sheet 1

Inventor
Albert Kingsbury

By Mauro, Cameron, Lewis & Kerkam
Attorneys

May 8, 1928. 1,668,648
A. KINGSBURY
THRUST BEARING
Filed June 14, 1923 2 Sheets-Sheet 2

Inventor
Albert Kingsbury
By Maury Cameron Lewis & Kerkam
Attorneys

Patented May 8, 1928.

1,668,648

UNITED STATES PATENT OFFICE.

ALBERT KINGSBURY, OF GREENWICH, CONNECTICUT, ASSIGNOR TO KINGSBURY MACHINE WORKS, INC., OF PHILADELPHIA, PENNSYLVANIA, A CORPORATION OF DELAWARE.

THRUST BEARING.

Application filed June 14, 1923. Serial No. 645,379.

This invention relates to thrust bearings for horizontal or inclined shafts, and more particularly to means for supplying oil to the bearing surfaces.

It has heretofore been common practice in the lubrication of thrust bearings for horizontal or inclined shafts to cause the thrust collar to dip into a body of oil below the shaft openings of the bearing housing and to rely upon the adhesion of the oil to the surface of the collar for carrying oil upwardly to lubricate those portions of the bearing surfaces which are above the level of oil in the well. The quantity of oil that can be raised by adhesion to the rotating thrust collar depends primarily upon the speed of rotation of the collar and the viscosity of oil. Hence the thinner the oil, the smaller the quantity that can be raised by adhesion; consequently, if the temperature of the thrust collar rises to a relatively high degree because of the absorption of heat arising from the friction losses of the bearing, the oil thereon may become so thin that an insufficient quantity of oil is raised to properly lubricate all of those portions of the bearing surfaces which are above the level of the oil in the well.

Where adhesion of the oil to the rotating thrust collar is relied upon for supplying oil to the bearing surfaces in the upper portion of the bearing, it is also customary to provide means for removing the oil from the oil carrying surface and deflecting it to the bearing surfaces. The use of such oil collecting means, which consume more or less space, also introduces constructional difficulties in the design of the bearing.

It is an object of this invention to provide novel means for insuring an adequate supply of lubricant to the bearing surfaces above the level of the oil in the oil well without depending upon adhesion of oil to the surface of the rotating thrust collar, and therefore also without the necessity for the use of oil collecting and deflecting means in the upper portion of the bearing.

In my prior Patent No. 1,201,057, granted October 10, 1916, and reissued June 8, 1920, No. 14,878, I have disclosed a method and structure for lubricating thrust bearings for horizontal or inclined shafts whereby the oil is caused to flow radially inward across the bearing surface of the thrust collar, and lubricate the same throughout its entire width, by the centrifugal action of the rotating thrust collar. In the structure disclosed in my prior patent, the movement of the oil by centrifugal action is due to the difference in the areas of the two faces of the thrust collar which are freely exposed to the contact of the oil, the centrifugal action of the rear face of the collar on the oil in contact therewith being considerably in excess of the centrifugal action of the bearing face of said collar on the oil in the intershoe spaces, so that the former sets up and maintains a circulation of oil and enables the rotation of the thrust collar to force adequate quantities of oil into the chamber containing the bearing surfaces so as to maintain the latter properly lubricated. In view of the necessity for unequal areas exposed to the oil at the two faces of the thrust collar, however, this method of lubricating the bearing surfaces is particularly designed for single acting thrust bearings.

It is an object of this invention to provide a thrust bearing for horizontal or inclined shafts with means employing centrifugal action for supplying adequate quantities of lubricant to the bearing surfaces which are equally available for either double acting thrust bearings or single acting thrust bearings.

Another object of this invention is to provide a thrust bearing for horizontal or inclined shafts with novel means for lubricating the bearing surfaces which utilize the suction created by the rotation of the rotatable bearing member as well as the centrifugal action developed by the rotation of said member.

Another object of this invention is to provide a thrust bearing for horizontal or inclined shafts which includes novel lubricating means whereby oil may be supplied to the bearing members at a plurality of distributed points around said bearing members, and if desired at a plurality of points throughout the entire periphery of the rotatable bearing member.

Another object of this invention is to provide a thrust bearing for horizontal or inclined shafts with lubricating means operating by centrifugal action which will prime quickly, even though the rotatable member has a relatively high speed of rotation, and which will force copious quantities of oil to the bearing surfaces under the different conditions of service.

Another object of this invention is to provide lubricating means for the thrust bearings of horizontal or inclined shafts which is simple in construction, inexpensive to manufacture, easy to install, efficient in operation, and reliable and durable in service.

Stated generally, the invention, in its preferred embodiment, comprises the combination of a rotatable bearing member, one or more bearing members cooperating with said rotatable bearing member, means providing a body of oil, and means cooperating with the periphery of said rotatable bearing member whereby centrifugal action will force oil from said body of oil to the bearing surfaces of said members, said means including a suction chamber into which oil is drawn by the rotation of said rotatable member and means on the rotatable member whereby the oil is forced from said suction chamber by centrifugal action.

The invention is capable of receiving a variety of mechanical expressions some of which are shown on the accompanying drawings, but it is to be expressly understood that the drawings are for purposes of illustration only and are not to be construed as a definition of the limits of the invention, reference being had to the appended claims for that purpose.

Referring in detail to the drawings wherein the same reference characters designate corresponding parts in the several figures:—

Figure 1:
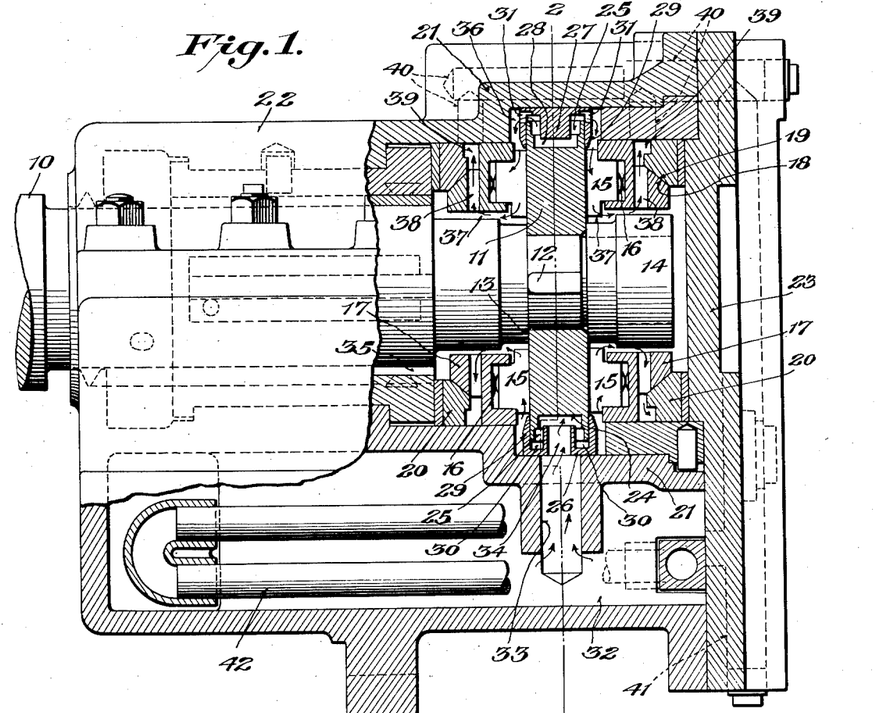
Fig. 1 is an axial section, partly in elevation, of a thrust bearing for a horizontal or inclined shaft embodying the present invention.
Figure 4:
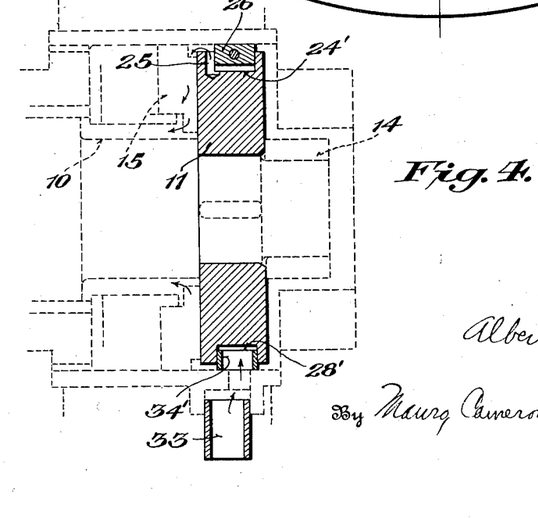
Fig. 4 is a corresponding view of a single acting thrust bearing constituting an embodiment of certain features of this invention.

In the form shown in Fig. 1, the horizontal or inclined shaft 10 is provided with a rotatable bearing member 11 of any suitable construction, shown as a thrust collar suitably keyed to the shaft at 12 and retained against the shoulder 13 by a ring nut 14. Cooperating with one or both faces of said rotatable bearing member are stationary bearing members of any suitable construction. In the form shown, each stationary bearing member includes a plurality of bearing segments or shoes 15 tiltably mounted in any suitable way, as by cooperating spherically-faced projections 16, on equalizing means of any suitable construction, shown as in the form of a base ring 17 provided with a spherical face 18 which rests in the spherical socket 19 of a leveling washer 20. While equalizing means of the ball and socket type have been illustrated, however, it is to be expressly understood that the invention is not limited thereto, as the bearing segments or shoes may be mounted on any other suitable form of equalizing means, such for example as the series of equalizing members disclosed in my Patent No. 1,361,073, granted December 7, 1920; also, while bearing members of the type employing separate bearing segments or shoes have been illustrated, it is to be expressly understood that the invention is not restricted thereto, as any other suitable form of bearing member may be employed, such for example as a flexible or semi-flexible or a continuous or semicontinuous bearing structure; moreover, while the bearing illustrated is of the type adapted to sustain thrust in either direction, it is to be expressly understood that the present invention is applicable to bearings adapted to sustain thrust in one direction only, in which event a stationary bearing member would be associated with only one face of the thrust collar 11, as illustrated in Fig. 4.

Surrounding the bearing members heretofore described is a bearing housing of any suitable form and construction, the same preferably including a cylindrical wall 21 that closely surrounds the thrust collar 11 but leaves a narrow annular space as illustrated. In the form shown, the bearing housing is extended at one side of the thrust bearing as shown at 22 to provide a housing for a journal or steady bearing, the opposite end of the housing being closed by a cover plate 23 of any suitable construction. It is to be expressly understood, however, that if desired the shaft may extend entirely through the housing, in which event shaft openings will be provided at both ends of the housing instead of one end only, and two journal bearings may be employed, one at either end of the thrust bearing, or the thrust bearing need not be associated with a journal bearing.

In conformity with the present invention means are associated with the rotatable bearing member for supplying oil by centrifugal action to the bearing surfaces of the bearing members from a body of oil in the bearing housing. In the form shown, the periphery of the thrust collar 11 is provided with a continuous annular groove 24 and with a plurality of apertures 25 which extend from said groove 24 to the periphery of the collar on each side of said groove. As shown in Fig. 1 this groove is preferably undercut so as to extend under the inner ends of the apertures 25. Said apertures 25 may be spaced outwardly from the lateral edges of the groove 24 so as to be entirely surrounded by metal, but they may break into the groove 24 as illustrated, constituting a series of notches or recesses in the lateral walls of said groove. Cooperating with said annular groove 24 is a stationary annular member 26 which preferably fits closely within the bore of the housing wall 21 and which may be held against rotation in any suitable way, as by means of a dowel pin (not shown) mounted in the wall 21 and engaging a recess or aperture in said member. Said stationary member 26 is preferably made in halves suitably held together, and includes an annular projection 27 which projects into and closely fits the outer portion of said groove 24 to substantially close the same except for the exits through the apertures 25 and the inlet apertures to be described. Said annular projection 27 also completes the apertures 25 when they are formed as shown so as to break through the lateral walls of the groove 24. The diameter of the bore of said projection 27 is preferably slightly smaller than the maximum diameter of the undercut portion of said groove, but said projection terminates short of the bottom of the groove 24 so as to leave an annular suction chamber 28 between the two. In the form illustrated, the annular member 26 is of a generally E-shaped cross section, the intermediate arm of the E constituting the annular projection 27 heretofore described, and the end arms 29 of said member constituting flanges which closely embrace the faces of the thrust collar and project inwardly on said faces into close proximity with the periphery of the stationary bearing members. The axially extending portions of the member 26 on either side of the annular projection 27 are spaced radially from the periphery of the thrust collar 11 at either side of the groove 24 so as to leave annular chambers 30 which communicate with the chamber 28 through the apertures 25. The arms 29 of the member 26 are also provided with apertures 31 which communicate with the aforesaid annular chambers 30 and lead to the spaces containing the bearing surfaces. Any suitable number of apertures 31 may be provided and they may be distributed as desired around the member 26, preferably being positioned at spaced points throughout the periphery of the same.

Figure 2:
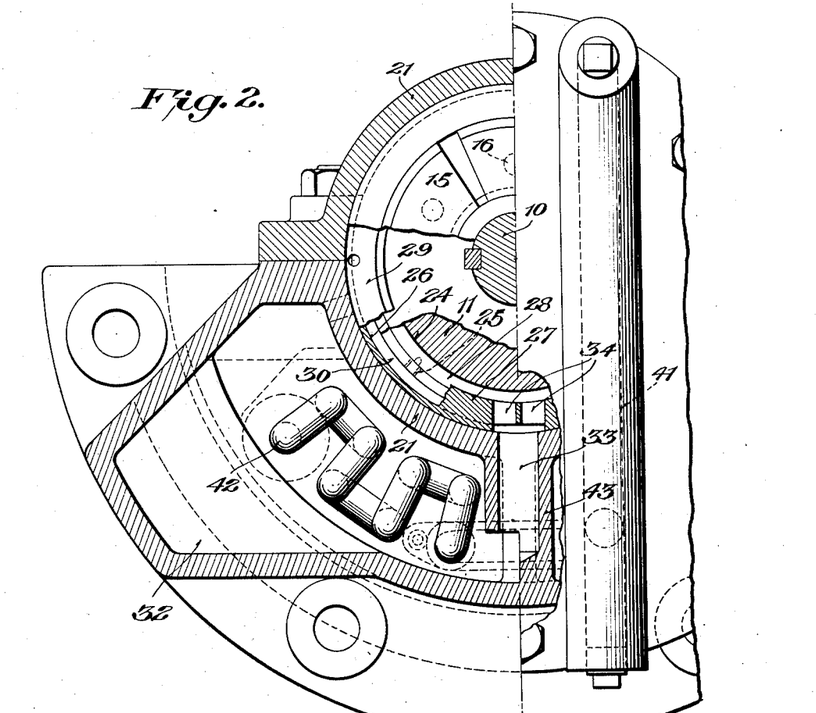
Fig. 2 is a half transverse section, parts being broken away, and a half end elevation, parts being broken away, of the bearing shown in Fig. 1.

Means are also provided whereby the suction chamber 28 is in continuous communication with a body of oil. In the form shown, the lower portion of the bearing housing is enlarged as shown in Figs. 1 and 2 to provide an oil well 32, and said oil well communicates with said chamber 28 through a passage 33, which leads from adjacent the bottom of the oil well through the wall 21 of the bearing housing, and one or more apertures 34 in the member 26, which communicate at their outer ends with the passage 33 and which lead through the projection 27 of the member 26 to the said chamber 28. A body of oil is maintained in said oil well at such a level that it is a short distance below the level of the bottom of the shaft openings when the shaft is not rotating and yet may rise in the passages 33 and 34 and the annular chamber 28 so that a considerable portion of the lower part of said chamber is filled with oil. Then, when the thrust collar 11 starts to rotate, the oil in the chamber 28 is thrown outwardly, by the action of the apertures 25, into the annular chambers 30, from which it may escape through the apertures 31, fresh oil flowing into the chamber 28 through the passages 33 and 34 and being in turn thrown outwardly into the chambers 30 by successive apertures 25 as they become filled with oil.

The bearing housing and associated parts are preferably so constructed as to provide oil-retaining chambers in which the bearing members are disposed. In the form shown, an oil-retaining chamber is provided at the right hand side of the collar as viewed in Fig. 1 between said collar and the cover plate 23, and a similar oil-retaining chamber is provided at the left hand side of the thrust collar, between said thrust collar and the journal bearing 35. As the annular member 26 substantially fills the space between the periphery of the thrust collar and the bore of the cylindrical wall 21, said oil chambers are out of communication with each other and also with the body of oil in the well except as oil may gradually leak from said chambers to the well.

The oil may be delivered from the apertures 31 so as to circulate through said oil-retaining chambers in any suitable way. In the form shown, the oil is delivered from said apertures 31 to annular chambers 36 surrounding the periphery of the stationary bearing members, and from said chambers 36 the oil flows radially inward between the bearing shoes to wet the faces of the thrust collar 11 throughout their radial width. From the inner ends of the inter-shoe spaces the oil flows axially along the shaft through the annular passages 37, and then radially outward through the passages 38 in the base rings 17 to the annular chambers 39 between said base rings and the leveling washers 20. From the latter chambers the oil may be returned to the oil well in any suitable way as through cored passages 40 connecting said chambers 39 with a return passage 41, which may also be a cored passage in the bearing housing or an external pipe as desired.

The oil being returned through the passage 41 may be led through an exterior oil cooling device, or, as illustrated, a cooling coil 42 may be provided in said oil well for cooling the returned oil before redelivery to the bearing surfaces. When the cooling coil is located in the oil well it is preferable that the returned oil be caused to traverse the length of the coil so that the major portion of the heat absorbed during its passage through the bearing may be abstracted before the oil is returned to the bearing surfaces. To this end a longitudinally extending partition 43 preferably divides the oil well into two chambers which communicate at one end of said partition, and the oil is delivered to the well at the opposite end of one chamber while the oil is drawn from the well to the bearing surfaces from the corresponding end of the opposite chamber. Thereby the oil returning to the oil well is caused to traverse one-half of the cooling coil before it can escape from the chamber to which it is delivered, and then must traverse the other half of the cooling coil before reaching the passage 33 through which it is drawn from the oil well.

In operation, the oil, which stands in the lower portion of the annular chamber 28 when the bearing parts are stationary, is thrown outwardly under the action of centrifugal force and carried circumferentially by the rotating apertures 25, and fresh oil flowing into the chamber 28 through the passages 33 and 34 in turn is forced outwardly and circumferentially by succeeding apertures 25 as they rotate and become filled with oil flowing in from the body of the oil. This oil forced outwardly and circumferentially by the apertures 25 fills the chambers 30 and, from these chambers, flows through the apertures 31 into the oil retaining chambers to wet the bearing surfaces. As any substantial flow of oil from these chambers directly back to the oil well is prevented by the relatively close fit of the parts as heretofore described, the oil rises in said chambers until they are filled with oil and the bearing surfaces are therefore immersed therein. Thereafter a continuous circulation of oil is maintained through said chambers by the delivery of oil thereto from the apertures 31, the oil flowing radially inward through the intershoe spaces, axially along the shaft through the passages 37, radially outward through the passages 38, to the chambers 39 and then returning to the oil well through the passages 40 and 41. While this circulation of the oil radially inward across the bearing surfaces and then radially outward behind the bearing parts is preferred, it is to be expressly understood that by suitably rearranging the passages the oil delivered by the apertures 31 may first flow inwardly at the rear of the bearing parts and then outwardly through the intershoe spaces to the passages for the return to the oil well.

As the oil is withdrawn from the oil well to fill the oil-retaining chambers, the level of the oil in the oil well drops, but the radially narrow annular space 28 afforded by the groove 24 and the closely-fitting annular projection 27 constitutes a suction chamber wherein suction is created by the relative rotation of the thrust collar 11 and the stationary member 26, so that oil continues to be sucked into said chamber through the passages 33 and 34, and is forced by centrifugal action from said chamber 28 into the chambers 30, and thence into the oil retaining chambers, even though the level of the oil in the well may drop below the periphery of the thrust collar. Therefore, by providing an oil well of sufficient capacity so that the lower end of the passage 33 shall not be uncovered when the oil-retaining chambers and passages are filled with oil, a copious supply of lubricant will be forced to the bearing surfaces notwithstanding the fact that the oil in the oil well drops below the periphery of the rotatable bearing member.

The journal bearing 35 may be, and preferably is, lubricated from the oil supplied by the action of the pumping means heretofore described. The oil may flow to the journal bearing from the oil retaining chamber adjacent thereto through a restricted opening as illustrated, but as it is preferable to lead cool oil to the journal bearing, one or more suitable passages may be provided between the journal bearing and the chamber 36, such passages preferably leading to the end of the journal bearing remote from the thrust bearing so that the oil flows from the journal bearing into the oil retaining chamber adjacent thereto to mingle with the oil in said chamber and be carried back to the oil well through the passages 40 and 41.

The arms or flanges 29 at the ends of the member 26 overlap the faces of the thrust collar outside of the periphery of the stationary bearing members so that these portions of said bearing surfaces cannot develop a centrifugal action on the oil in contact therewith to offset or diminish the circulation provided by the pumping means heretofore described. These latter arms or flanges on the member 26 are unnecessary however when, owing to the relative diameters of the shaft and the periphery of the stationary bearing members, it is unnecessary that the thrust collar project radially beyond the periphery of the stationary bearing members in order to permit the collar to project suitably below the level of the oil when the parts are at rest and still retain the level of the oil at a suitable distance below the shaft openings when the shaft is stationary. Therefore when the diameter of the periphery of the stationary bearing members is such as compared to the diameter of the shaft that the entire width of the faces of the thrust collar may be engaged by the stationary bearing members and said collar still project a suitable distance below the level of the oil in the well when the parts are stationary, the flanges 29 may be dispensed with and the annular chambers 30 may open directly into the annular spaces 36 around the periphery of the stationary bearing members. Again, if the groove 24 also be of sufficient width so that the annular projection 27 may properly cover the passage 33 leading to said groove, the axial extensions on the member 26 become unnecessary, and the member 26 may then be of substantially rectangular formation as shown at 26' in Figs. 3 and 4, one or more apertures 34' being provided in said member through which oil may flow to the chamber 28'.

Figure 3:
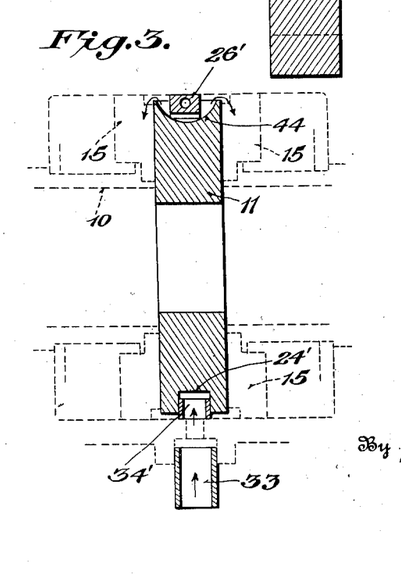
Fig. 3 is a schematic section illustrating another embodiment of certain features of this invention.

In the form shown in Fig. 3, the apertures through which the oil is delivered from the chamber 28' to the oil-retaining chambers take the form of milled slots 44 transverse to the annular groove 24', and this method of forming these apertures may be used in the other constructions illustrated, if desired. If the bearing is to sustain thrust in one direction only, so that only one stationary bearing member is employed, the apertures 25 are positioned on only one side of the groove 24' as shown in Fig. 4, and the suction chamber 28' therefore delivers oil to only one side of the thrust collar. Similarly, in the structure of Fig. 1, one series of apertures 25 and the corresponding end of the stationary annular member 26 may be omitted so that oil will be delivered to only one side of the thrust collar if the bearing is to sustain thrust in only one direction.

In the forms illustrated the apertures 25, whether formed by milling as in Fig. 3, drilling as in Figs. 1 and 4 or any other suitable way, extend radially of the collar and are therefore equally effective in forcing the oil outwardly by centrifugal action whether the thrust collar rotates in one direction or the other. If the thrust collar is to rotate in only one direction, however, said apertures 25 may be suitably inclined to the radii so as to increase their impelling action on the oil for that direction of rotation.

In the forms shown in Figs. 3 and 4 the annular groove 24' is not undercut so as to underlie the ends of the apertures 25 or 44. While this arrangement is suitable for certain speeds, the undercut groove as illustrated in Fig. 1 is preferable for high speeds of rotation, so as to facilitate the priming of the oil pumping means, but while it is preferable to undercut the groove 24 some of the advantages of this invention may be obtained without undercutting said groove, and it is therefore within the contemplation of this invention to provide a suction chamber which is not undercut.

It will therefore be perceived that a thrust bearing for horizontal or inclined shafts has been provided with means for supplying oil to the bearing surfaces which do not depend upon the adhesion of the oil to the thrust collar and which avoid the use of oil collecting and deflecting means. Moreover, means have been provided for supplying oil by centrifugal action to the bearing surfaces of a thrust bearing for horizontal or inclined shafts which are equally available for double acting thrust bearings and for single acting thrust bearings. Again, means have been provided for supplying oil to the bearing surfaces of a thrust bearing for horizontal or inclined shafts which enable the oil to be raised by suction from a body of oil in an oil well even though the level of the oil in said well is below the periphery of the rotatable member. Also, means have been provided whereby the oil may be delivered at distributed points around the bearing surfaces, and if desired, throughout the periphery of said surfaces. Furthermore oil pumping means have been provided which prime quickly even at high speeds of rotation which are simple in construction, require no special construction of the bearing members and are easy to install; and which are durable and reliable in operation and efficient in forcing copious quantities of lubricant to the bearing surfaces.

While the embodiments of the invention illustrated on the drawings have been described with considerable particularity, it is to be expressly understood that the invention is not restricted thereto, as the same is capable of receiving a variety of forms, some of which will now readily suggest themselves to those skilled in the art, while changes may be made in the details of construction, arrangement, and proportion of parts, and certain features used without other features thereof, without departing from the spirit of this invention. Reference is therefore to be had to the claims hereto appended for a definition of the limits of the invention, it being expressly understood that the term "thrust bearings for horizontal shafts" as used in said claims is used as generic to bearings for both horizontal and inclined shafts.

What is claimed is:

1. In a thrust bearing for horizontal shafts, the combination of a rotatable bearing member, bearing members associated with the opposed faces of said rotatable member, means providing a body of oil, and means cooperating with said rotatable member whereby oil is forced exteriorly of said member to the bearing surfaces of said members from said body of oil by the centrifugal action developed by the rotation of said rotatable member.

2. In a thrust bearing for horizontal shafts, the combination of a rotatable bearing member, one or more bearing members associated with said rotatable member, means providing a body of oil, a passage whereby oil may flow directly from said body of oil to the periphery of said rotatable member, and means including a member cooperating with the periphery of said rotatable member whereby oil is drawn from said body of oil by the suction, and forced to the bearing surfaces of said members by the centrifugal action, developed by the rotation of said rotatable member.

3. In a thrust bearing for horizontal shafts, the combination of a rotatable bearing member, bearing members associated with both faces of said rotatable member, means providing a body of oil into which said rotatable member dips when said member is stationary, and means on said rotatable member for forcing oil from said body of oil to the bearing surfaces of said members by centrifugal action.

4. In a thrust bearing for the horizontal shafts, the combination of a rotatable bearing member, bearing members associated with one or both faces of said rotatable member, means providing a body of oil, and means on the periphery of said rotatable member for forcing oil from said body of oil to the bearing surfaces of said members by centrifugal action.

5. In a thrust bearing for horizontal shafts, the combination of a rotatable bearing member, one or more bearing members associated with said rotatable member, means providing a body of oil, and means cooperating with the periphery of said rotatable member for delivering oil by centrifugal action from said body of oil to the opposed bearing surfaces of said rotatable member at spaced points throughout the periphery of said rotatable member.

6. In a thrust bearing for horizontal shafts, the combination of a rotatable bearing member, one or more bearing members associated with said rotatable member, means providing a body of oil, and means including a member cooperating with said rotatable member whereby oil is delivered by centrifugal action from said body of oil to the opposed bearing surfaces of said rotatable member at a plurality of distributed points.

7. In a thrust bearing for horizontal shafts, the combination of a rotatable bearing member, bearing members cooperating with the opposed faces of said rotatable member, means providing a body of oil, and means cooperating with said rotatable member whereby oil is raised from said body of oil by said rotatable member and supplied by centrifugal action to the bearing surfaces of said members.

8. In a thrust bearing for horizontal shafts, the combination of a rotatable bearing member, one or more bearing members associated with said rotatable member, means providing a body of oil, and means cooperating with said rotatable member whereby said member sucks oil vertically from the body of oil beneath said member and forces it by centrifugal action exteriorly of said member to the bearing surfaces of said members.

9. In a thrust bearing for horizontal shafts, the combination of a rotatable bearing member, one or more bearing members associated with said rotatable member, means providing a body of oil, means cooperating with said rotatable member to provide a suction chamber in communication with said body of oil, and means rotating with said rotatable member whereby the oil drawn into such suction chamber is forced to the bearing surfaces of said members.

10. In a thrust bearing for horizontal shafts, the combination of a rotatable bearing member, one or more bearing members associated with said rotatable member, means cooperating with the periphery of said rotatable member to provide a suction chamber, means providing a body of oil in communication with said suction chamber, and rotating means for forcing oil out of said suction chamber.

11. In a thrust bearing for horizontal shafts, the combination of a rotatable bearing member, one or more bearing members associated with said rotatable member, means cooperating with said rotatable member to provide a suction chamber, means providing a body of oil in communication with said suction chamber, and means carried by the periphery of said rotatable member for forcing the oil out of said suction chamber.

12. In a thrust bearing for horizontal shafts, the combination of a rotatable bearing member, one or more bearing members associated with said rotatable member, means providing a body of oil, means cooperating with a peripheral groove on said rotatable member to provide a suction chamber into which oil is sucked from said body of oil by the rotation of said member, and means on said rotatable member for forcing the oil out of said suction chamber by centrifugal action.

13. In a thrust bearing for horizontal shafts, the combination of a rotatable bearing member, one or more bearing members associated with said rotatable member, means providing a body of oil, means associated with a circumferential groove on said rotatable member to provide a suction chamber into which oil is sucked from said body of oil by the rotation of said member, and means whereby centrifugal action forces the oil from said chamber.

14. In a thrust bearing for horizontal shafts, the combination of a rotatable bearing member, one or more bearing members associated with said rotatable member, means providing a body of oil, means cooperating with a circumferential groove on said rotatable member and providing a radially narrow annular suction chamber communicating with said body of oil, and means on said rotatable member for forcing the oil from said chamber by centrifugal action.

15. In a thrust bearing for horizontal shafts, the combination of a rotatable bearing member, one or more bearing members associated with said rotatable bearing member, means providing a body of oil, means cooperating with said rotatable member to provide a suction chamber whereby oil is drawn from said body of oil, and means on said rotatable member and associated with said chamber whereby the oil is ejected from said chamber to the bearing surfaces of said members by centrifugal force at a plurality of distributed points.

16. In a thrust bearing for horizontal shafts, the combination of a rotatable bearing member, one or more bearing members associated with said rotatable member, means providing a body of oil, means cooperating with the periphery of said rotatable member to provide a suction chamber communicating with said body of oil, and means whereby centrifugal action forces oil from said chamber at distributed points about the bearing surfaces of said members.

17. In a thrust bearing for horizontal shafts, a rotatable bearing member provided with an annular groove, one or more bearing members associated with said rotatable member, means providing a body of oil, and an annular member closing said groove except for communication below the level of the oil whereby said groove constitutes a suction chamber into which oil is drawn from said body of oil by the rotation of said member.

18. In a thrust bearing for horizontal shafts, a rotatable bearing member provided with an annular groove, one or more bearing members associated with said rotatable member, means providing a body of oil, a member cooperating with said groove whereby said groove constitutes a suction chamber into which oil is drawn from said body of oil by the rotation of said member, and means on said rotatable member whereby the oil drawn into said chamber is forced to the bearing surfaces by centrifugal action.

19. In a thrust bearing for horizontal shafts, a rotatable bearing member, one or more bearing members associated with said rotatable member, means providing a body of oil, means cooperating with said rotatable member to provide an annular suction chamber in communication with said body of oil, and apertures in said rotatable member through which oil is forced from said suction chamber by the rotation of said member.

20. In a thrust bearing for horizontal shafts, a rotatable bearing member, one or more bearing members associated with said rotatable member, means providing a body of oil, means cooperating with the periphery of said member to provide an annular suction chamber in communication with said body of oil, and apertures in the periphery of said rotatable member through which oil is forced from said suction chamber by centrifugal action due to the rotation of said member.

21. In a thrust bearing for horizontal shafts, the combination of a rotatable bearing member having a peripheral groove and apertures communicating with said groove, one or more bearing members associated with said rotatable member, means cooperating with said groove to provide a suction chamber, and means providing a body of oil in communication with said groove.

22. In a thrust bearing for horizontal shafts, the combination of a rotatable bearing member, one or more bearing members associated with said rotatable member, a member cooperating with said rotatable member to provide a suction chamber, said member having one or more flanges overlapping the faces of said rotatable member, apertures in said flanges in communication with said suction chamber, and means providing a body of oil in communication with said suction chamber.

23. In a thrust bearing for horizontal shafts, the combination of a rotatable bearing member having a peripheral groove and apertures in communication with said groove adapted to throw oil out of said groove by centrifugal action, one or more bearing members associated with said rotatable member, a stationary member cooperating with said groove whereby the said groove constitutes a suction chamber, and means providing a body of oil in communication with said groove.

24. In a thrust bearing for horizontal shafts, the combination of a rotatable bearing member, one or more bearing members associated with said rotatable member, a housing for said bearing including one or more oil-retaining chambers in which said bearing members are disposed, means providing a body of oil, and means including a groove in the periphery of said rotatable member and radially directed apertures communicating therewith whereby the centrifugal action developed by the rotation of said member sucks up oil from said body of oil and maintains said chamber or chambers full of oil.

25. In a thrust bearing for horizontal shafts, the combination of a rotatable bearing member, bearing members associated with the opposed faces of said rotatable member, a housing for said bearing including oil-retaining chambers in which said bearing members are disposed, means providing a body of oil, and means cooperating with said rotatable member whereby oil is drawn from said body of oil and forced by centrifugal action into said chambers to maintain the bearing surfaces of said members immersed in oil.

26. In a thrust bearing for horizontal shafts, the combination of a rotatable bearing member provided with a peripheral groove, one or more bearing members associated with said rotatable member, a stationary annular member projecting into said groove and cooperating therewith to provide a suction chamber, and means providing a body of oil in communication with said suction chamber.

27. In a thrust bearing for horizontal shafts, the combination of a rotatable bearing member having a peripheral groove and apertures communicating with said groove, one or more bearing members associated with said rotatable member, a stationary annular member projecting into said groove to provide a suction chamber, and means providing a body of oil in communication with said suction chamber.

28. In a thrust bearing for horizontal shafts, the combination of a rotatable bearing member having an undercut peripheral groove, one or more bearing members associated with said rotatable member, a member cooperating with said groove to provide a suction chamber, a plurality of apertures in the periphery of said rotatable member communicating with said suction chamber, and means providing a body of oil in communication with said suction chamber.

29. In a thrust bearing for horizontal shafts, the combination of a rotatable bearing member, one or more bearing members associated with said rotatable member, a housing for said bearing including one or more oil retaining chambers in which said bearing members are disposed, an oil well below said bearing members, means cooperating with the periphery of said rotatable member to provide a suction chamber, said suction chamber being in communication with said oil well, means on said rotatable member whereby oil is forced by centrifugal action from said suction chamber into said oil retaining chamber or chambers, and one or more passages for the return of the oil to said oil well.

30. In a thrust bearing for horizontal shafts, the combination of a rotatable bearing member, one or more bearing members associated with said rotatable member, an oil well below said bearing members, means associated with said rotatable member whereby the oil is raised from said oil well and forced by centrifugal action to the bearing surfaces of said members, a cooling coil in said oil well, and means in said oil well whereby the oil returning thereto must traverse the length of said coil before it is again returned to the bearing surfaces.

31. In a thrust bearing for horizontal shafts, the combination of a rotatable bearing member, one or more bearing members associated with said rotatable member, an oil well below said bearing members, a cooling coil therein, means cooperating with the periphery of said rotatable member to provide a suction chamber through which oil is raised and delivered to the bearing surfaces of said members, and means in said well whereby the oil returning thereto must traverse the length of said colling coil before it flows to said suction chamber.

32. In a thrust bearing for horizontal shafts the combination of a rotatable bearing member, one or more bearing members associated with said rotatable member, means providing a body of oil, means cooperating with said rotatable member whereby oil may be raised from said body of oil by suction created by the rotation of said member, and means whereby said oil is distributed to the bearing surfaces of said members by centrifugal action.

33. In a thrust bearing for horizontal shafts, the combination of a rotatable bearing member, one or more bearing members associated with said rotatable member, means providing a body of oil, a member cooperating with the periphery of said rotatable member whereby oil is raised by suction from said body of oil, and means on said rotatable member for distributing said oil to the bearing surfaces of said members by centrifugal action.

34. In a thrust bearing for horizontal shafts, the combination of a rotatable bearing member, one or more bearing members associated with said rotatable member, an oil well below said bearing members, means whereby the oil is circulated from said well to said bearing members and returned to said well, a cooling coil in said well, and a partition in said well whereby the oil returning thereto must traverse said well and coil twice before returning to said bearing members.

35. In a thrust bearing for horizontal shafts, the combination of a rotatable bearing member, one or more bearing members associated with said rotatable member, an oil well below said bearing members, means associated with said rotatable member whereby the oil is raised from said oil well and forced by centrifugal action to the bearing surfaces of said member, one or more journaled bearings associated with the shaft, and means whereby said journal bearing or bearings are lubricated by oil raised by said rotatable bearing member.

36. In a thrust bearing for horizontal shafts, the combination of a rotatable bearing member, one or more bearing members associated with said rotatable member, said rotatable bearing member being provided with a peripheral groove and apertures communicating with said groove, a member cooperating with said groove and providing therewith a suction chamber with which said apertures communicate, and a body of oil in communication with said suction chamber.

37. In a thrust bearing for horizontal shafts, the combination of a rotatable bearing member, one or more bearing members associated with said rotatable member, said rotatable bearing member being provided with a peripheral groove and apertures communicating with said groove, a member cooperating with said groove to provide a suction chamber and spaced radially from the periphery of said rotatable member at one or both sides of said suction chamber to provide a chamber or chambers into which said apertures deliver oil from said suction chamber, and a body of oil in communication with said suction chamber.

38. In a thrust bearing for horizontal shafts, the combination of a rotatable bearing member, one or more bearing members associated with said rotatable member, said rotatable member being provided with a peripheral groove and apertures communicating with said groove, a member cooperating with said groove to provide a suction chamber, said member being spaced from the periphery of said rotatable member at one or both sides of said suction chamber to provide a chamber or chambers into which said apertures deliver oil from said suction chamber, one or more flanges on said member cooperating with the lateral faces of said rotatable member and provided with apertures in communication with said last named chamber or chambers, and a body of oil in communication with said suction chamber.

39. In a thrust bearing for horizontal shafts, a rotatable bearing member provided with a peripheral groove, one or more bearing members associated with said rotatable bearing member, an annular member cooperating with said groove to constitute a suction chamber, an oil well below but in communication with said suction chamber, and means associated with said suction chamber whereby oil raised thereinto from said oil well is distributed to the bearing surfaces of said members.

40. In a thrust bearing for horizontal shafts, a rotatable bearing member provided with a peripheral groove, one or more bearing members associated with said rotatable bearing member, an annular member cooperating with said groove to constitute a suction chamber, an oil well below but in communication with said suction chamber, and apertures in said rotatable member communicating with said suction chamber and acting to discharge oil from said suction chamber by centrifugal action, whereby oil is raised from said oil well and delivered to the bearing surfaces of said members.

In testimony whereof I have signed this specification.

ALBERT KINGSBURY.